United States Patent
Hambrick

[15] 3,697,026
[45] Oct. 10, 1972

[54] STAND FOR CHRISTMAS TREES

[72] Inventor: John Earl Hambrick, Route 1, Hahira, Ga. 31632

[22] Filed: April 14, 1971

[21] Appl. No.: 133,859

[52] U.S. Cl..................................248/46, 248/48
[51] Int. Cl. ..............................A47g 33/12
[58] Field of Search...............248/44, 46, 48, 156

[56] References Cited

UNITED STATES PATENTS

| | | | |
|---|---|---|---|
| 871,050 | 11/1907 | Vogt | 248/48 |
| 923,206 | 6/1909 | Singleton | 248/48 |
| 1,151,745 | 8/1915 | Wagner | 248/48 |
| 2,277,803 | 3/1942 | Varner | 248/48 |
| 2,444,390 | 6/1948 | White | 248/48 |
| 2,755,049 | 7/1956 | Curtiss | 248/46 |
| 2,851,823 | 9/1958 | Peterson | 248/156 |
| 3,295,802 | 1/1967 | Leatherman | 248/44 |

FOREIGN PATENTS OR APPLICATIONS 413,278   12/1966   Switzerland.................248/48

Primary Examiner—Marion Parsons, Jr.
Attorney—Alexander & Dowell

[57] ABSTRACT

The stand for cut Christmas trees or the like has a plurality of inverted V-shaped frames evenly spaced around the tree trunk. Each frame is formed of heavy gauge wire and has a vertical leg adapted to contact the tree trunk, the lower end of the leg being adapted to rest on a floor and has an offset upturned pointed end adapted to be driven into the lower end of the tree trunk. The frame also has a second leg integrally connected with the upper end of the first leg by a coil and it extends downwardly and outwardly and has a lower portion adapted to rest on the floor. A link between the legs is provided to adjust the spaced relation of the lower ends of the legs to thereby support the tree trunk substantially perpendicular to the floor. A flexible cord is secured around the tree trunk and passes through all the coils.

4 Claims, 5 Drawing Figures

PATENTED OCT 10 1972 3,697,026

INVENTOR
JOHN E. HAMBRICK

ATTORNEYS

PATENTED OCT 10 1972 3,697,026
SHEET 2 OF 2
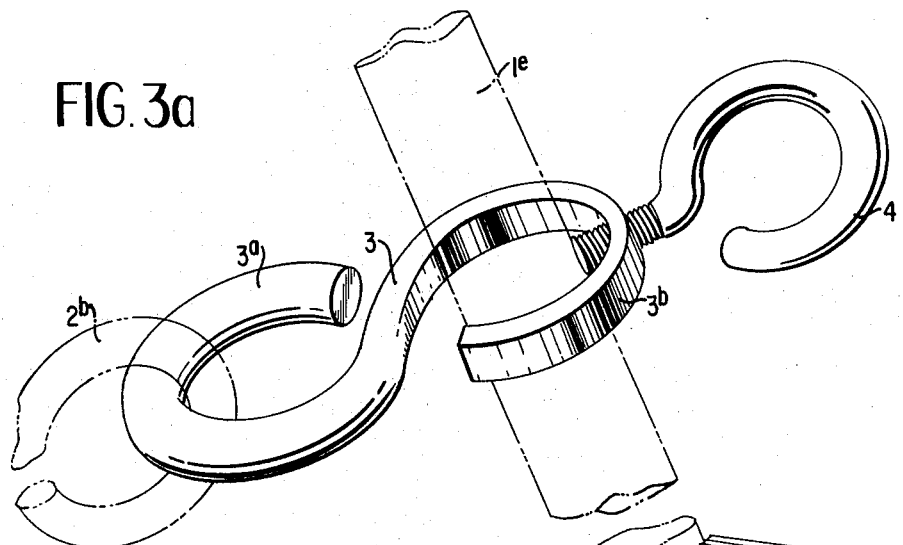
FIG. 3a
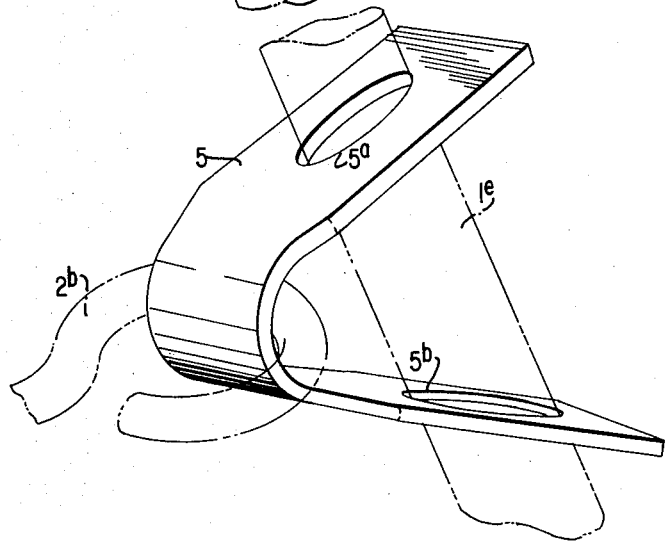
FIG. 3b
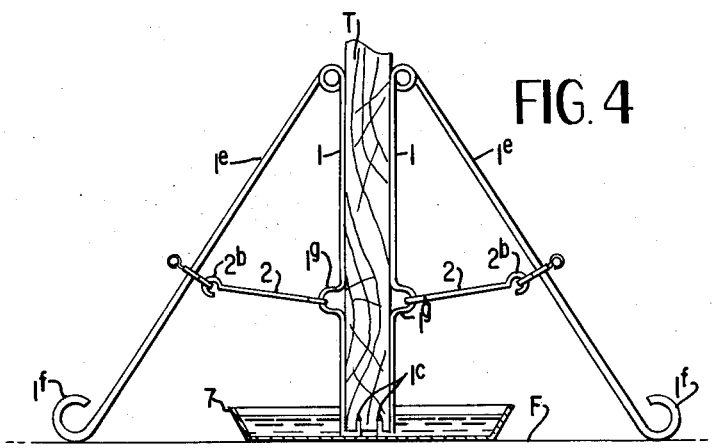
FIG. 4
INVENTOR
JOHN E. HAMBRICK
BY
ATTORNEYS

3,697,026

STAND FOR CHRISTMAS TREES

DESCRIPTION OF INVENTION

This invention is a novel stand and watering device for cut Christmas trees or the like, and the principal object of the invention is to provide a tree stand which is designed to be used in connection with any size Christmas tree without the user having to trim the lower branches of the tree or remove any limbs in installing the stand on the cut tree trunk.

Another object of the invention is to provide a tree stand of the above type in which the stand includes a plurality of inverted V-shaped frames evenly spaced around the tree trunk, the V-shaped frames having means to adjust the spacing of the legs of frames to compensate for any reasonable crook in the tree trunk and to allow the Christmas tree to be set up in such manner as to be substantially perpendicular to the floor on which the tree stands.

Other objects of the invention are to provide a stand of the above type which may be applied or used with a tree having a trunk of any size or shape, and to provide a stand which may be applied easily to the tree trunk and leveled easily without removing any of the lower limbs from the tree.

A still further object is to provide a stand of the above type in which the uprights are made of inexpensive material, such as heavy gauge wire, while at the same time providing a rigid stand whose tilt is adjustable by adjustment of the spread of the legs of the V-shaped frames to adjust the tilt of the stand and tree.

I will explain the invention with reference to the accompanying drawings, which illustrate several practical embodiments thereof, to enable others familiar with the art to adopt and use the same; and will summarize in the claims the novel features of construction and novel combinations of parts, for which protection is desired.

In said drawings:

FIG. 3a is a detail of part of the leg adjusting means.

FIG. 3b is a detail of a modified part of the leg adjusting means.

FIG. 4 is an enlarged sectional view taken on the line 4—4, FIG. 1.

Figure 1:
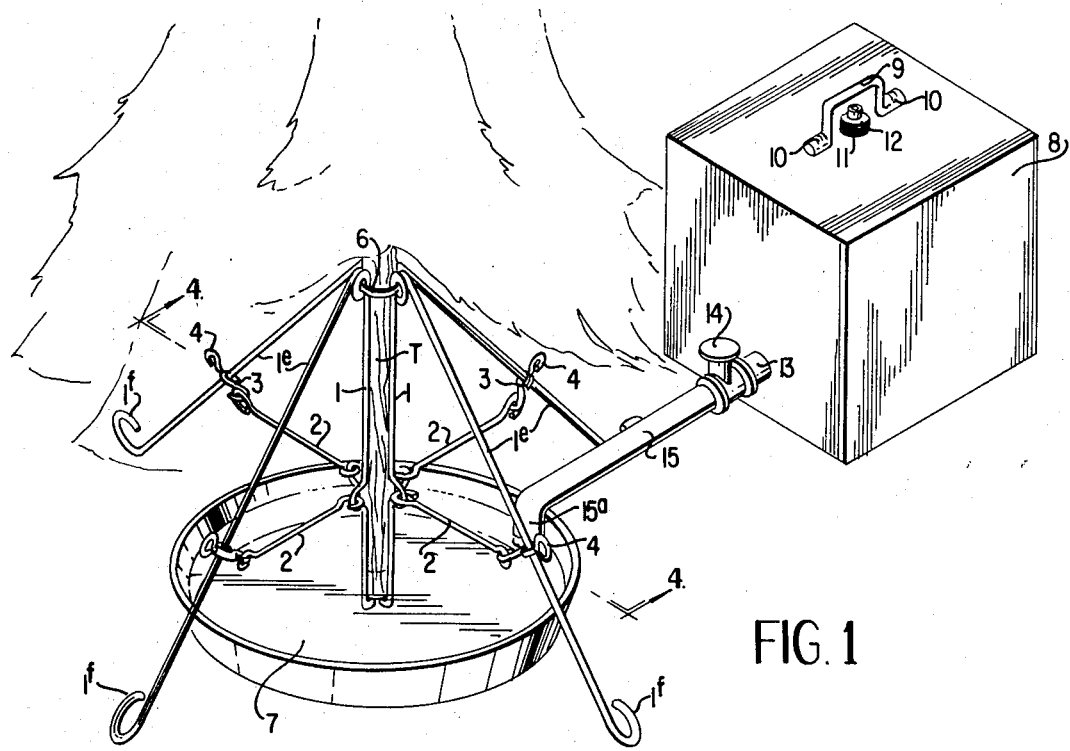
FIG. 1 is a perspective view of my stand and watering device for Christmas trees.

As shown in the drawings, my novel stand preferably comprises a plurality of invented V-shaped frames which may be evenly spaced about the trunk T of the Christmas tree or the like, four such frames being shown in FIG. 1.

Figure 2:
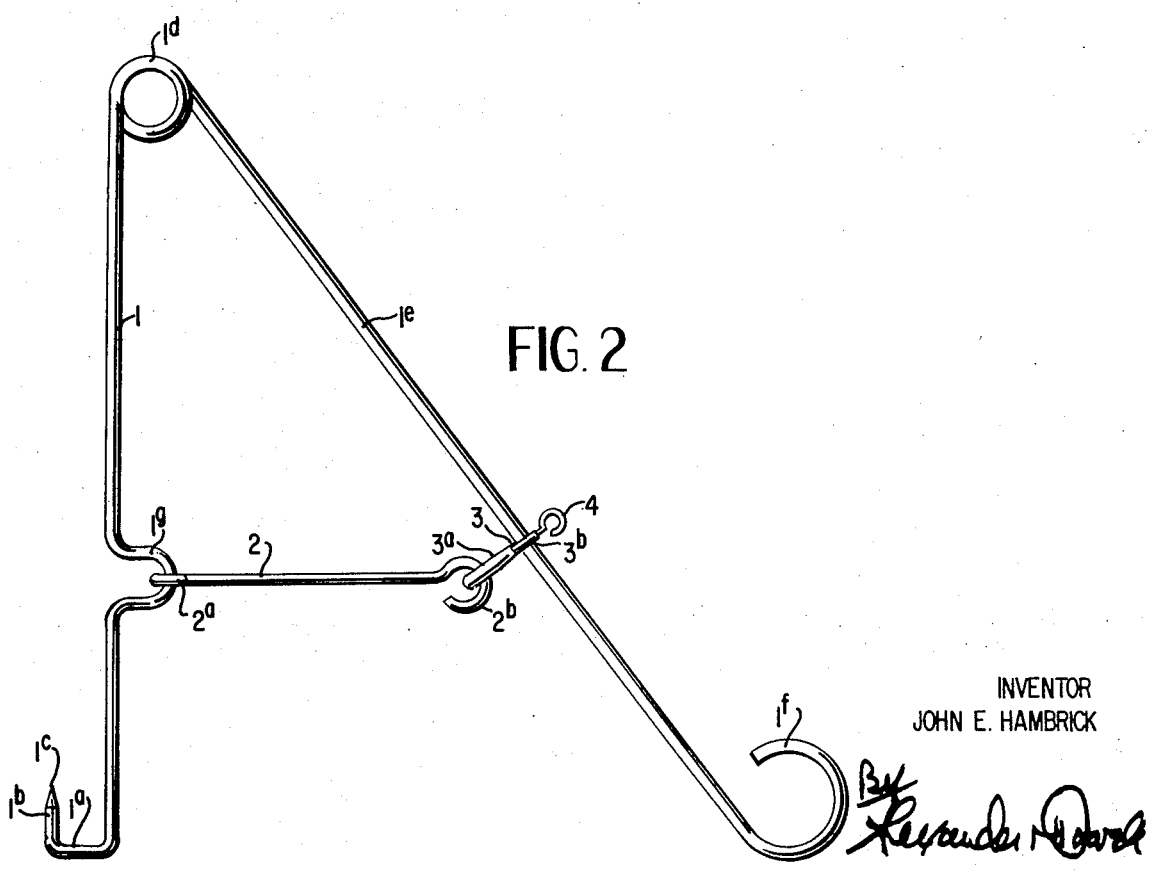
FIG. 2 is an enlarged elevational view of one of the inverted V-shaped frames of the stand, detached.

As shown in FIG. 2, each inverted V-shaped frame is preferably but not necessarily formed of heavy gauge wire, the same having a vertical leg 1 adapted to vertically contact the trunk T of the tree. The lower end of the leg 1 is outturned as at 1a, the outer end of which is further upturned as at 1b and sharpened or pointed as at 1c, FIGS. 2 and 4, and is adapted to rest upon the floor surface F. The upper end of the leg 1 terminates in a coil 1d, the end of which is directed downwardly and outwardly to form leg 1e of the inverted V-shaped frame, the lower end of the leg 1e terminating in a partial loop 1f also adapted to normally engage the surface of the floor F.

The legs 1 and 1e of each inverted V-shaped frame are held in adjusted spaced relation by means of a link 2 having an open eye 2a adjacent the leg 1 adapted to engage an offset eye or loop 1g formed in the leg 1 adjacent its midheight, said link 2 also having an open eye 2b formed in its opposite end adapted to engage an eye 3a in a member 3 which is slidably adjustable upon the leg 1e of the frame so that the leg 1e of the frame can be adjusted towards or from the vertical leg 1 to adjust the tilt of the tree T with respect to the floor F.

As shown in FIGS. 2 and 3a, one form of the slidable member 3 on the leg 1e may comprise an S-shaped member 3 having an open eye 3a at one end adapted to engage the open eye 2b of the link 2. The opposite end of the member 3 is preferably flattened as shown in FIG. 3a and is looped in the form of an eye 3b adapted to slidably engage the leg 1e of the frame, and eye 3b is provided with a threaded bore receiving a wing bolt 4 so that in adjusted position on the leg 1e the wing bolt 4 can be tightened to lock the eye 3b in fixed position thereon. However, by loosening the wing bolt 4 the member 3 may be moved up or down the leg 1e to thereby bring the looped lower end 1f of the leg 1e closer to or farther away from the lower end of the leg 1, such adjustment of the spread of the legs 1 and 1e permitting adjusting of the tilt of the stand and of the tree on the floor F.

Instead of using the S-member shown in FIG. 3a, a resilient V-shaped clip member 5 (FIG. 3b) of flat spring steel might be used, the legs thereof having opposed circular or elliptical holes 5a, 5b respectively therein which slidably engage the leg 1e. The clip member 5 being made of spring steel will permit the member 5 to be adjusted axially of the leg 1e when the legs thereof are squeezed towards each other, but when released the resiliency of the steel will cause the edges of the holes 5a, 5b, to bite into the material of the leg 1e and thereby lock the clip member 5 in adjusted position on the leg 1e. Obviously the loop 2b of the link 2 may engage the apex of the V-shaped clip member 5, as shown in FIG. 3b.

In mounting the inverted V-shaped frames on the tree trunk T the same are placed in spaced relation around the tree trunk, and the pointed ends 1c of the legs 1 driven vertically into the lower end of the trunk T as shown in FIG. 4. In order to secure the upper ends of the legs 1 to the tree trunk T a cord 6 of nylon or the like, FIG. 1, is passed around the trunk and through the loops 1d of the legs 1, and then tied so as to secure the upper ends of the legs 1 to the trunk T. The tree may then be placed in upright position and if the tree should lean to one side the tilt of the tree can be compensated for by merely adjusting the related members 3 or 5 on the legs 1e so that the lower ends of both legs 1 and 1e of the inverted V-shaped frames rest squarely upon the surface of the floor F.

I preferably use in connection with my tree stand a tree-watering device shown in FIGS. 1 and 4. As shown, a shallow pan 7 is placed on the floor F below the lower end of the trunk T, the pan 7 being of diameter to fit within the spread of the legs 1e of the frames, and the pan being adapted to hold a desired amount of water. Beside the pan 7 is a water tank 8 of any desired shape adapted to hold a quantity of water, the tank having at its top a pivotal handle 9 provided with outturned legs which are secured to the top of the tank 8 by means of loops 10, FIG. 1, so that the handle may be tilted. A filling opening 11 provided in the top of tank 8 having a removable threaded plug 12 which when removed permits filling of the tank.

On the side of the tank adjacent the tree is a nipple 13 connected to a gate-valve 14, which gate-valve is connected with an airtight pipe or tube 15 running horizontally over the top of the pan 7, the end of the tube 15 being downturned as at 15a, FIG. 1, but terminating above the bottom of the pan 7. By the above construction, when the parts are positioned as shown in FIG. 1 and the gate valve 14 opened, the water from the tank 8 will run into the pan 7 and will maintain the height of the water in the pan at the level of the lower end of the downturned portion 15a of tube 15 as long as any water remains in the tank 8.

I claim:

1. A floor stand for cut Christmas trees or the like comprising a plurality of inverted V-shaped frames evenly spaced around the tree trunk, each frame being formed of heavy gauge wire and having a vertical leg adapted to contact the tree trunk; the lower end of said leg being adapted to rest on a floor and having an offset upturned pointed and adapted to be driven into the lower end of the tree trunk; said frame having a second leg integrally connected with the upper end of the first leg by a coil and extending downwardly and outwardly and having a lower portion adapted to rest on said floor; means for adjusting the spaced relation of the lower ends of the said legs to thereby support the tree trunk substantially perpendicular to said floor; and a flexible cord secured around the tree trunk and passing through the said coils.

2. In a stand as set forth in claim 1, said adjusting means comprising a horizontal link having at one end an open eye engaging an offset loop in the vertical leg above its lower end; and said link having a second eye at its other end engaging an open eye in a member axially adjustable on said second leg.

3. In a stand as set forth in claim 2, said member comprising an S-shaped member having an open eye at one end; the opposite end having a flattened eye slidably engaging said second leg; said flattened eye having a threaded bore; and a wing bolt in said bore adapted to engage the second leg when tightened.

4. In a stand as set forth in claim 2, said member comprising a V-shaped clip of spring metal having opposed holes in its legs slidably receicing the second leg when the legs of the clip are squeezed together but frictionally engaging the said leg when released; the apex of the clip receiving the second open eye of the said link.

* * * * *